United States Patent
Irvine et al.

(10) Patent No.: US 7,564,382 B2
(45) Date of Patent: Jul. 21, 2009

(54) APPARATUS AND METHOD FOR MULTIPLE DESCRIPTION ENCODING

(75) Inventors: Ann C. Irvine, Bonsall, CA (US); Vijayalakshmi R. Raveendran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 375 days.

(21) Appl. No.: 10/715,572

(22) Filed: Nov. 17, 2003

(65) Prior Publication Data

US 2004/0141656 A1 Jul. 22, 2004

Related U.S. Application Data

(60) Provisional application No. 60/426,887, filed on Nov. 15, 2002.

(51) Int. Cl.
*H03M 7/00* (2006.01)
(52) U.S. Cl. ......................... 341/107; 382/239
(58) Field of Classification Search ............... 341/107, 341/50, 51; 704/230, 229; 382/238, 239, 382/170; 709/247; 375/240.27; 370/465
See application file for complete search history.

(56) References Cited

U.S. PATENT DOCUMENTS

| | | | |
|---|---|---|---|
| 5,021,891 A | 6/1991 | Lee | |
| 5,107,345 A | 4/1992 | Lee | |
| 5,301,242 A | 4/1994 | Gonzales et al. | |
| 5,452,104 A | 9/1995 | Lee | |
| 5,515,388 A | 5/1996 | Yagasaki | |
| 5,657,085 A | 8/1997 | Katto | |
| 5,748,792 A | 5/1998 | Wober | |
| 5,903,669 A | 5/1999 | Hirabayashi | |
| 5,905,813 A * | 5/1999 | Terane | 382/239 |
| 5,982,434 A * | 11/1999 | Tong et al. | 375/240.11 |
| 5,982,441 A | 11/1999 | Hurd et al. | |
| 5,990,957 A | 11/1999 | Ryoo | |
| 6,031,937 A | 2/2000 | Graffagnino | |
| 6,094,631 A * | 7/2000 | Li et al. | 704/230 |
| 6,111,913 A | 8/2000 | Murdock et al. | |
| 6,188,799 B1 | 2/2001 | Tan et al. | |
| 6,240,135 B1 | 5/2001 | Kim | |
| 6,256,349 B1 | 7/2001 | Suzuki et al. | |
| 6,480,547 B1 * | 11/2002 | Chen et al. | 375/240.27 |
| 6,526,174 B1 | 2/2003 | Graffagnino | |

(Continued)

FOREIGN PATENT DOCUMENTS

| | | |
|---|---|---|
| EP | 0711079 | 8/1996 |
| JP | 06233267 | 8/1994 |
| WO | 99059344 | 11/1999 |
| WO | 01028222 | 4/2001 |

OTHER PUBLICATIONS

European Search Report - EP03783644, European Search Authority-Munich, Jan. 12, 2005.

(Continued)

*Primary Examiner*—Rexford N Barnie
*Assistant Examiner*—Joseph Lauture

(57) ABSTRACT

Apparatus and method for generating multiple descriptions of compressed data is disclosed. In the apparatus and method, transform coefficients are generated from input data and quantized. An energy distribution of the quantized transform coefficients is generated. Based on the energy distribution, the transform coefficients are grouped into layers. By entropy coding different number of layers, multiple descriptions of compressed data are generated.

38 Claims, 8 Drawing Sheets

U.S. PATENT DOCUMENTS

| | | | |
|---|---|---|---|
| 6,529,634 B1 | 3/2003 | Thyagarajan | |
| 6,539,060 B1 | 3/2003 | Lee | |
| 6,665,346 B1 | 12/2003 | Lee | |
| 6,907,079 B2 | 6/2005 | Gomila et al. | |
| 6,950,473 B2 | 9/2005 | Kim et al. | |
| 6,996,283 B2 | 2/2006 | Thyagarajan | |
| 7,227,998 B2 | 6/2007 | Nakayama et al. | |
| 7,266,149 B2 | 9/2007 | Holcomb et al. | |
| 2002/0044602 A1 | 4/2002 | Ohki | |
| 2002/0085584 A1* | 7/2002 | Itawaki et al. | 370/465 |
| 2002/0099853 A1* | 7/2002 | Tsujii et al. | 709/247 |
| 2002/0122598 A1* | 9/2002 | Ribas-Corbera et al. | 382/239 |
| 2003/0044080 A1 | 3/2003 | Frishman et al. | |
| 2003/0202608 A1 | 10/2003 | MacInnis et al. | |
| 2003/0235250 A1 | 12/2003 | Varma et al. | |
| 2004/0179608 A1 | 9/2004 | Holliman et al. | |
| 2005/0276505 A1 | 12/2005 | Raveendran | |

OTHER PUBLICATIONS

International Search Report - PCT/US03/036827, International Search Authority - US, Sep. 2, 2004.

International Search Report - PCT/US03/036828, International Search Authority - US, Jul. 5, 2005.

International Search Report - PCT/US04/008287, International Search Authority - US, Aug. 17, 2004.

European Search Report - EP08075216, European Search Authority-Munich, Jun. 3, 2008.

Li, Jiankun, et al., "An Embedded DCT Approach to Progressive Image Compression," International Conference on Image Processing, vol. 1, Sep. 19, 1996, pp. 201-204.

* cited by examiner

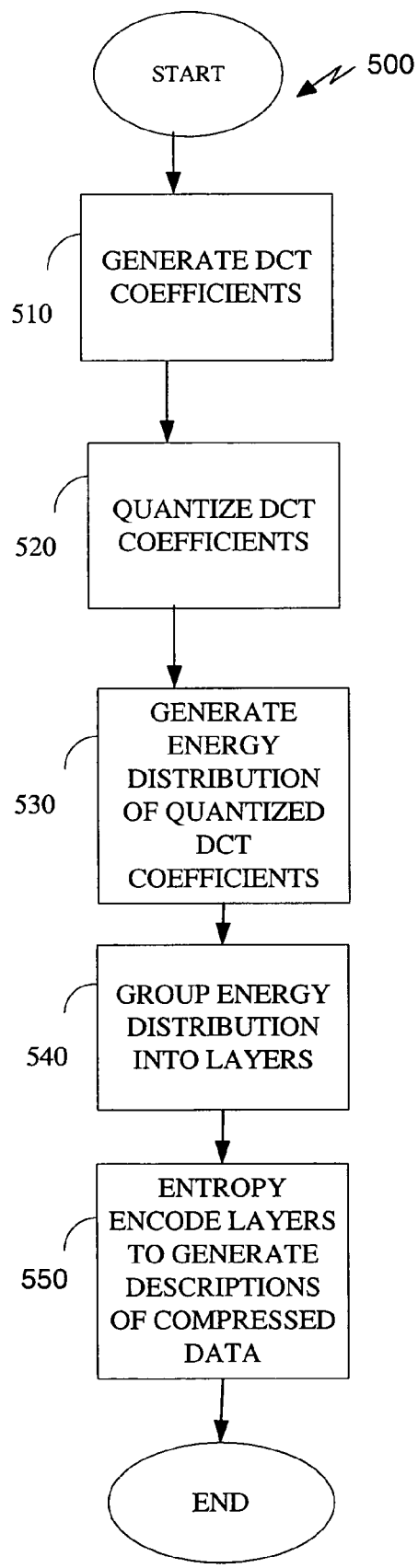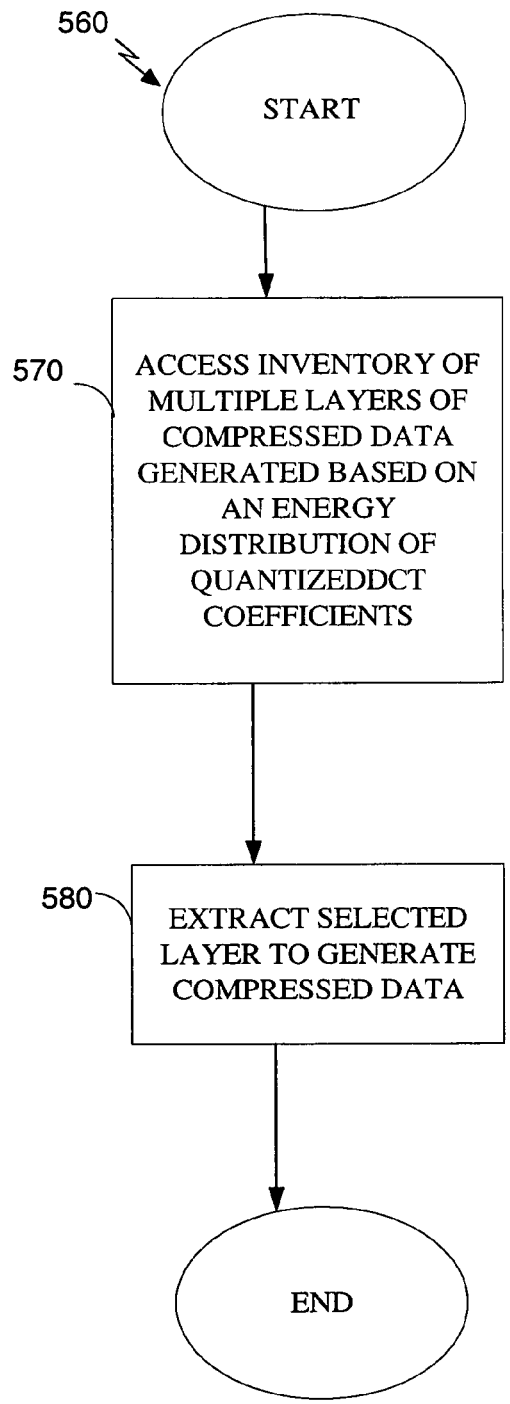
FIGURE 5A
FIGURE 5B

APPARATUS AND METHOD FOR MULTIPLE DESCRIPTION ENCODING

CROSS-REFERENCE TO RELATED APPLICATION

This application claims the benefit of U.S. Provisional Patent Application Serial No. 60/426,887, filed Nov. 15, 2002, which is incorporated herein by reference in their entirety.

BACKGROUND

I. Field of Invention

The invention generally relates to multi media and more particularly to discrete cosine transform based compression system for generating multiple descriptions of data.

II. Description of the Related Art

Typically, digital information is compressed using a preselected format or process by an encoder. However, conventional digital consumer formats such as High Definition Television (HDTV), Digital Versatile Disc or Video Disc (DVD), Advanced Television Systems Committee (ATSC), Digital Video Broadcast (DVB), Digital Satellite System (DSS) operate at various specific resolutions, frame rates and/or bit rates. Accordingly, in order to cater to the various formats, a compression technique that can generate multiple descriptions of video is required.

Current video compression standards that provide multiple descriptions do so in an innate form or are targeted toward a discrete application. For example, Joint Photographic Experts Group (JPEG) 2000 can generate multiple descriptions of video by reducing the video. However, being intraframe and wavelet based, JPEG 2000 inherently provides lower resolution images. Moreover, it is restricted to being dyadic, i.e. reduction factors are multiples of two. Motion Picture Experts Group (MPEG) 4 also supports multiple description discrete cosine transform (DCT) that targets limited or fixed bandwidth applications such as Internet video. In this technique, a rudimentary form of the video is transmitted. Consecutive transmissions are made to enhance the details (bits) in the video. A major disadvantage in this approach is motion compensation.

Therefore there is a need for a more versatile, simple and/or efficient system that can generate multiple descriptions of video or video sequences.

SUMMARY

Embodiments disclosed herein address the above stated needs by providing a system for generating multiple descriptions of compressed data. In one embodiment, a method for generating multiple descriptions of compressed data comprises generating transform coefficients from input data; quantizing the transform coefficients; generating an energy distribution of the quantized transform coefficients; grouping the transform coefficients into layers based on the energy distribution; and entropy coding a first number of layers to generate a first description of compressed data.

In another embodiment, an apparatus for generating multiple descriptions of compressed data comprises means for generating transform coefficients from input data; means for quantizing the transform coefficients; means for generating an energy distribution of the quantized transform coefficients; means for grouping the transform coefficients into layers based on the energy distribution; and means for entropy coding a first number of layers to generate a first description of compressed data.

In still another embodiment, an apparatus for generating multiple descriptions of compressed data comprises a transform module configured to generate transform coefficients from input data; a quantization module coupled to the transform module and configured to quantize the transform coefficients; a layering module coupled to the quantization module, the layering module configured to generate an energy distribution of the quantized transform coefficients and to group the transform coefficients based on the energy distribution; and an entropy coder coupled to the layering module and configured to entropy code a number of layers to generate a description of compressed data.

In the above embodiments, the transform coefficients may be grouped in an order of significance. The transform coefficients may be grouped by splitting the transform coefficients into multi-bit units; and grouping the multi-bit units into layers. The transform coefficients may also be grouped by splitting the transform coefficients into nibbles; and grouping the nibbles into layers. Here, higher and lower nibbles may be grouped separately into layers. The transform coefficients may further be grouped by splitting the transform coefficients into crumbs; and grouping the nibbles and crumbs into layers. Additionally, the embodiments may further comprise entropy coding a second number of layers to generate a second description of compressed data. The embodiments may further comprise entropy coding each additional number of layers to generate a master inventory of compressed data. The embodiments may further comprise arranging the quantized transform coefficients prior to generating the energy distribution.

In a further embodiment, a method for generating compressed data based on quantized transform coefficients of the data comprises accessing an inventory of multiple layers of compressed data generated based on an energy distribution of the quantized transform coefficients; and extracting a selected number of layers from the inventory to generate the compressed data.

In still a further embodiment, an apparatus for generating compressed data based on quantized transform coefficients of the data comprises means for accessing an inventory of multiple layers of compressed data generated based on an energy distribution of the quantized transform coefficients; and means for extracting a selected number of layers from the inventory to generate the compressed data.

In yet another embodiment, an apparatus for generating compressed data based on quantized transform coefficients of the data comprises a storage medium configured to store an inventory of multiple layers of compressed data generated based on an energy distribution of the quantized transform coefficients; and a selection module coupled to the storage medium and configured to extract a selected number of layers from the inventory to generate the compressed data.

BRIEF DESCRIPTION OF THE DRAWINGS

Various embodiments will be described in detail with reference to the following drawings in which like reference numerals refer to like elements, wherein:

FIGS. 5A and 5B show methods for a generating one or more descriptions of compressed data;

FIGS. 7A to 7D show various masks for generating layers; and

DETAILED DESCRIPTION

Figure 1B:
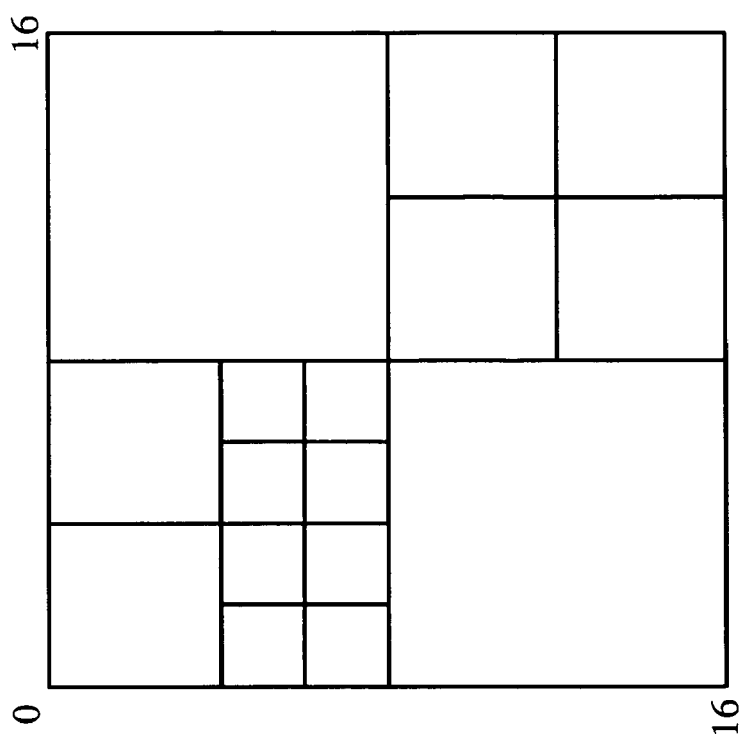
FIGS. 1A and 1B show adaptively sized blocks and sub-blocks for ABSDCT.

Generally, embodiments described below allow transform based compression system to generate multiple descriptions of compressed data from input video data stream. In the following description, specific details are given to provide a thorough understanding of the embodiments. However, it will be understood by one of ordinary skill in the art that the embodiments may be practiced without these specific detail. For example, circuits may be shown in block diagrams in order not to obscure the embodiments in unnecessary detail. In other instances, well-known circuits, structures and techniques may be shown in detail in order not to obscure the embodiments.

Also, it is noted that the embodiments may be described as a process which is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, as disclosed herein, the term "video" refers to the visual portion of multimedia and will be used interchangeably with the term "image." A storage medium may represent one or more devices for storing data, including read only memory (ROM), random access memory (RAM), magnetic disk storage mediums, optical storage mediums, flash memory devices and/or other machine readable mediums for storing information. The term "machine readable medium" includes, but is not limited to portable or fixed storage devices, optical storage devices, wireless channels and various other mediums capable of storing, containing or carrying instruction(s) and/or data.

In addition, an input video or image data stream is typically composed of image frames. An image frame can generally be divided into slices, a slice can be divided into data blocks, and a data block can be divided into pixels which are the smallest units of an image. Each image frame comprises an integer number of slices and each image slice represents the image information for a set of 16 consecutive scan lines. In such case, each data block corresponds to a 16×16 pixel block across the image of the frame. Also, a frame may be separated into even and odd slices, thereby forming even half frame and odd half frame. In one embodiment, half frames are the fundamental packets of compressed data information that are processed by a decoder. Moreover, an image pixel can be commonly represented in the Red, Green and Blue (RGB) color component system. However, because the human eye is more sensitive to changes in luminance and less sensitive to changes in chrominance, the YCbCr color space is typically used in video compression to represent image pixels. The YCbCr color space is a linear transformation of the RGB components, where Y is the luminance component, and Cb and Cr are the color components. If a frame is separated into even/odd frames, there would be three even half frames and three odd half frames corresponding to the components Y, Cb and Cr.

In the description above, a slice can represent a set of consecutive scan lines other than 16 consecutive scan lines. Also, a different color space with the same or different number of color components may be used to represent an image pixel in accordance with the invention.

Furthermore, compression techniques typically are based on discrete cosine transform (DCT) in which the size of each data block is fixed. One dynamic image compression technique capable of offering significant compression while preserving the quality of image signals utilizes adaptively sized blocks and sub-blocks of encoded DCT coefficient data. This technique will hereinafter be referred to as the adaptive block size discrete cosine transform (ABSDCT). The adaptive block sizes are chosen to exploit redundancy that exists for information within a frame of image data. The technique is disclosed in U.S. Pat. No. 5,021,891, entitled "Adaptive Block Size Image Compression Method And System." DCT techniques are also disclosed in U.S. Pat. No. 5,107,345, entitled "Adaptive Block Size Image Compression Method And System," and the use of the ABSDCT technique in combination with a Discrete Quadtree Transform technique is discussed in U.S. Pat. No. 5,452,104, entitled "Adaptive Block Size Image Compression Method And System." The systems disclosed in these patents utilize intraframe encoding, wherein each frame of an image sequence is encoded without regard to the content of any other frame.

Figure 1A:
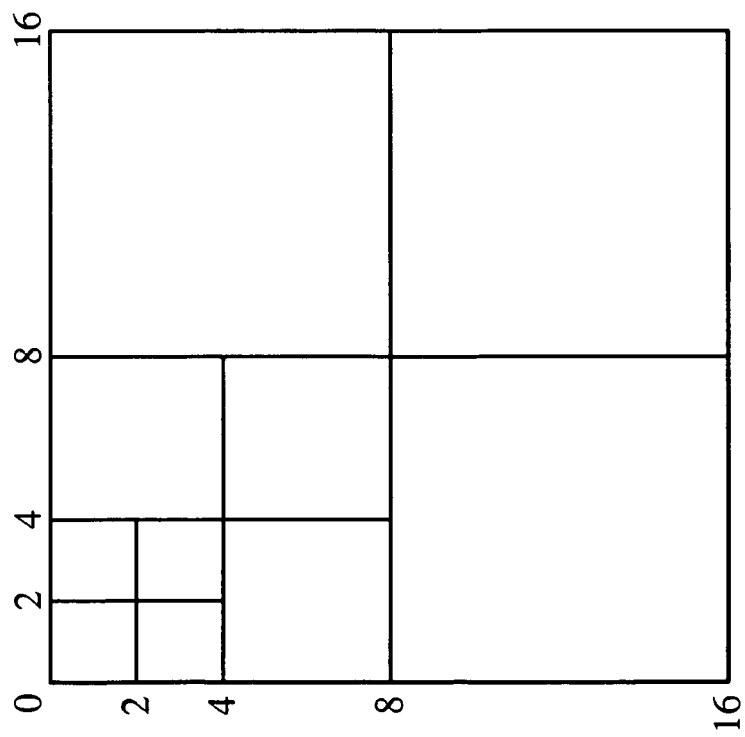

Generally, each of the luminance and chrominance components is passed to a block interleaver (not shown). A 16×16 block is presented to the block interleaver, which orders the image samples within the 16×16 blocks to produce blocks and composite sub-blocks of data for DCT analysis. FIG. 1A shows an example, where one 16×16 DCT is applied to a first ordering, four 8×8 DCTs are applied to a second ordering, 16 4×4 DCTs are applied to a third ordering, and 64 2×2 DCTs are applied to a fourth ordering. The DCT operation reduces the spatial redundancy inherent in the image source. After the DCT is performed, most of the image signal energy tends to be concentrated in a few DCT coefficients.

For the 16×16 block and each sub-block, the transformed coefficients are analyzed to determine the number of bits required to encode the block or sub-block. Then, the block or the combination of sub-blocks which requires the least number of bits to encode is chosen to represent the image segment. FIG. 1B shows an example where two 8×8 sub-blocks, six 4×4 sub-blocks, and eight 2×2 sub-blocks are chosen to represent the image segment. The chosen block or combination of sub-blocks is then properly arranged in order. The DCT coefficient values may then undergo further processing such as, but not limited to quantization and variable length coding.

For purposes of explanation, the transform based compression system for generating multiple descriptions or layers of compressed data will be discussed with reference to ABSDCT algorithm. However, it would be apparent to those skilled in the art that the invention is not limited to the use of ABSDCT. Other mathematical transforms such as, for example, DCT, Hadamard transform and Integer transform may also be used.

Generally, ABSDCT based compression supports encoding of up to 10-bit 4:4:4 1920×1080 images. However, the ABSDCT algorithm is inherently scalable and can handle higher bit-depths with expanded bit-widths. It can also compress images of any size, including 4K×4K, since it is a block-based compression. Given this flexibility of ABSDCT, a system compresses, for example, a 4K×2K, 12-bit, 4:4:4 image for visually lossless image quality. The resulting bit stream of block-wise DCT coefficients would, if completely decoded, produce the DC playback sequence. This bit stream is grouped and arranged such that lower resolution sequences can be extracted using simple operations of cropping. Such system results in a multiple description compression system.

More particularly, the input data may be encoded once to generate a complete bit stream or a "Master Inventory." Within the master inventory are multiple levels of inventories. Here, a high level inventory may comprise one ore more lower level inventories. Typically, the highest level inventory would be the master inventory. Also, each inventory comprises a compressed bit stream that may caters to a different target application.

Figure 2:
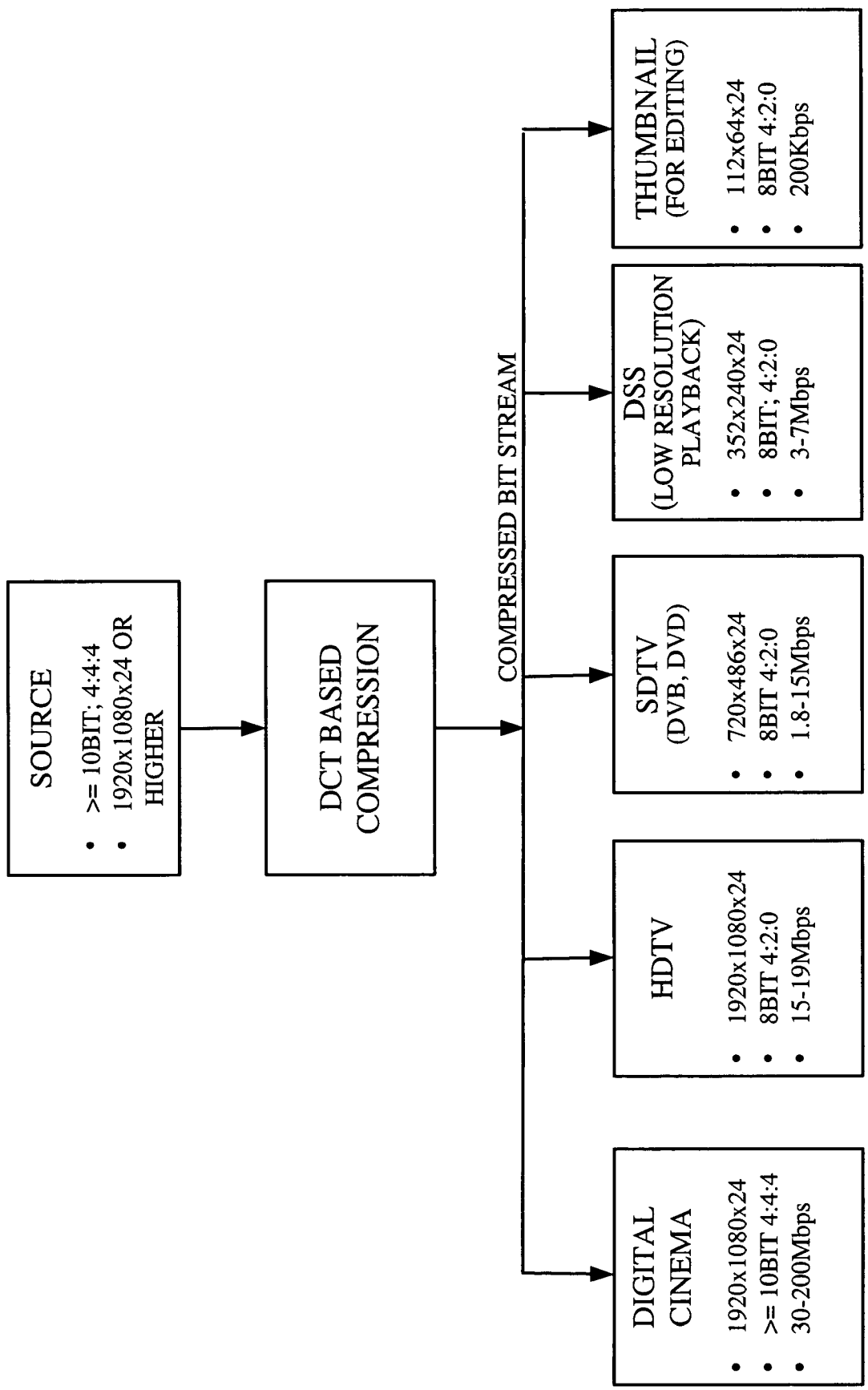
FIG. 2 shows example target applications.

FIG. 2 shows some target applications such as Digital Cinema, High Definition Television (HDTV), Standard Television (SDTV), Digital Satellite System (DSS) and thumbnails that operate at compressed bit streams of different resolutions and bit rates. Other applications include, but are not limited to, Digital Versatile Disc or Video Disc (DVD), Advanced Television Systems Committee (ATSC), Digital Video Broadcast (DVB). As shown, a source data may have a format of 10 bit, 4:4:4 and 1920×1080×24 or higher resolution. Digital Cinema requires a resolution of 1920×1080×24, a frame rate greater or equal to 10 bit 4:4:4 and bit rate of 30~200 Mbps. HDTV requires a resolution of 1920×1080× 24, a frame rate of 8 bit 4:2:0 and bit rate of 15~19 Mbps. SDTV requires a resolution of 720×486×24, a frame rate of 8 bit 4:2:0 and bit rate of 1.8~15 Mbps. DSS requires a resolution of 352×240×24, a frame rate of 8 bit 4:2:0 and bit rate of 3-7 Mbps. Thumbnails require a resolution of 112×64×24, a frame rate of 8 bit 4:2:0 and bit rate of 200 Mbps.

Figure 3:
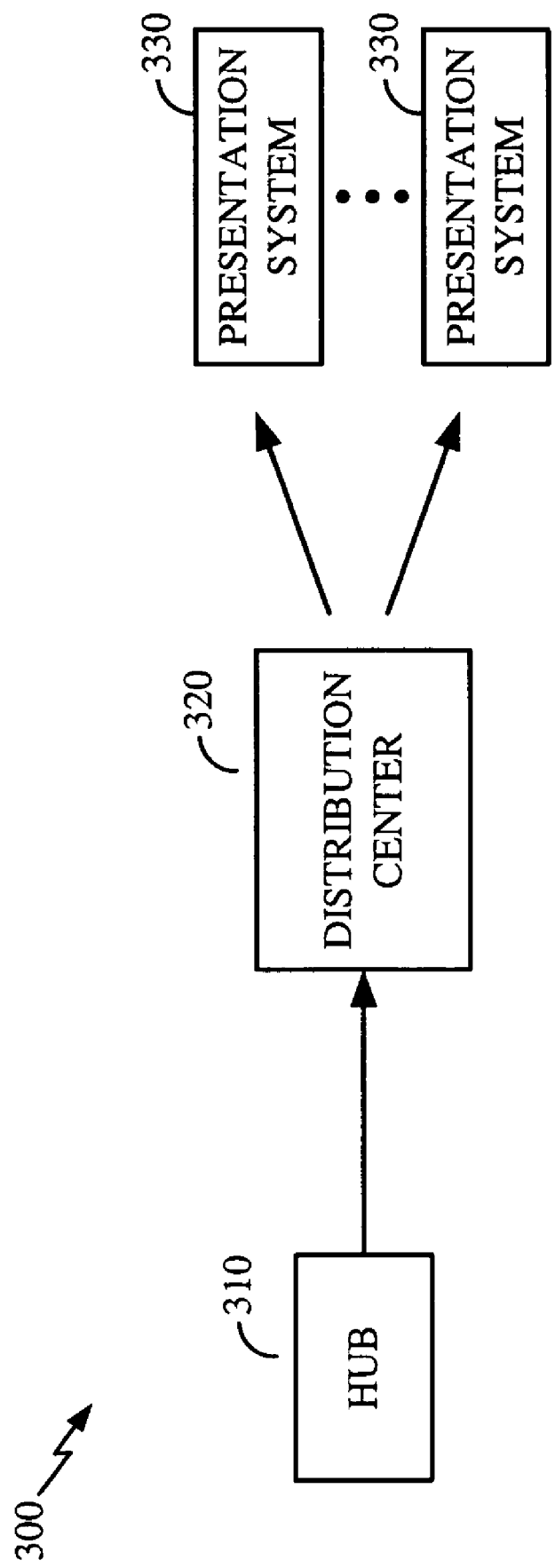
FIG. 3 shows an example of a multiple description compression system for generating and playback of images.

FIG. 3 shows an example system 300 for generation and playback of image sequences based on a multiple description compression system. Generally, a hub 310 generates a master inventory or a portion of the master inventory comprising of multiple inventories. Hub 310 may then output the master inventory or the portion to a distribution center 320. Distribution center 320 may then output various inventories, each catering to a different target application or presentation system 330 for playback. As shown, there may be one or more presentation systems 330, catering to the same or different target applications. Here, hub 310 and distribution center 320 may be implemented together. Alternatively, hub 310 and distribution center 320 may be implemented as separate structures or at separate locations. Similarly, distribution center 320 and presentation system 330 may be implemented together. Also similarly, distribution center 320 and presentation system 330 may be implemented as separate structures or at separate locations. If hub 310 and distribution center 320 or if distribution center 320 and presentation system 330 are implemented at separate location, data may be transmitted using a wireless medium, a non-wireless medium, a portable storage medium or a combination thereof.

Figure 4A:
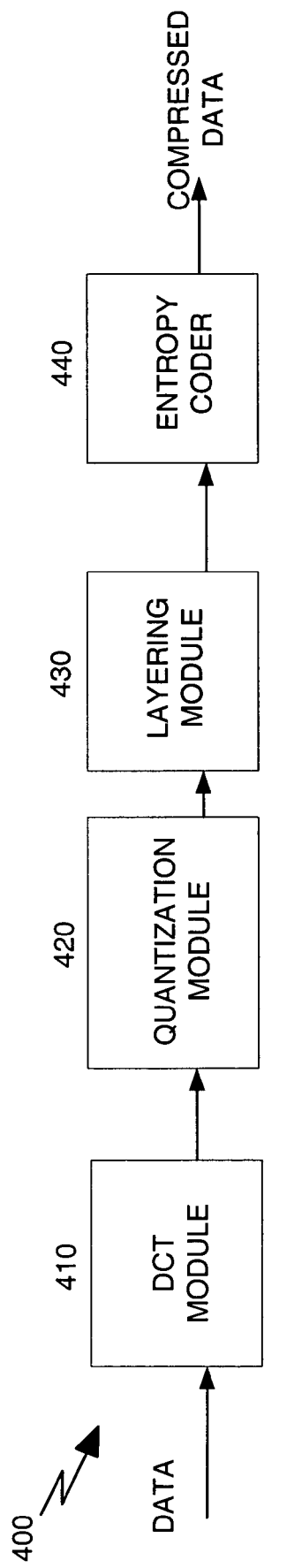
FIGS. 4A and 4B show an example encoder and server for a multiple description compression system.

More particularly, Hub 310 may include an encoder 400 shown in FIG. 4A that receives digital video information, such as a motion image sequence, to be compressed. Encoder 400 is capable of compressing input data into multiple descriptions of compressed data and comprises a transform module 410, a quantization module 420, a layering module 430 and an entropy coder 440. In one embodiment, transform module 430 may be a DCT module using a DCT based algorithm and more specifically, may be a DCT module using ABSDCT. However, other transform based algorithms may also be applicable.

Typically, transform module 410 converts the input data information from spatial to frequency domain and generates transform coefficients. Quantization module 420 quantizes the transform coefficients. Layering module 430 generates an energy distribution of the quantized transform coefficients and groups the transform coefficients into layers based on the energy distribution. Entropy coder 440 entropy codes a number of layers to generate an inventory of a certain level. Entropy coder 440 may encode different numbers of layers to generate inventories of different levels, wherein each inventory comprises different layers of compressed data. Entropy coder 440 may further entropy code additional numbers of layers to generate each possible inventory, thereby generating a master inventory. Here, various variable length encoder may be used as entropy coders, such as for example, Golomb coder, Rice Coder, Huffman engine or a combination thereof.

Figure 4B:
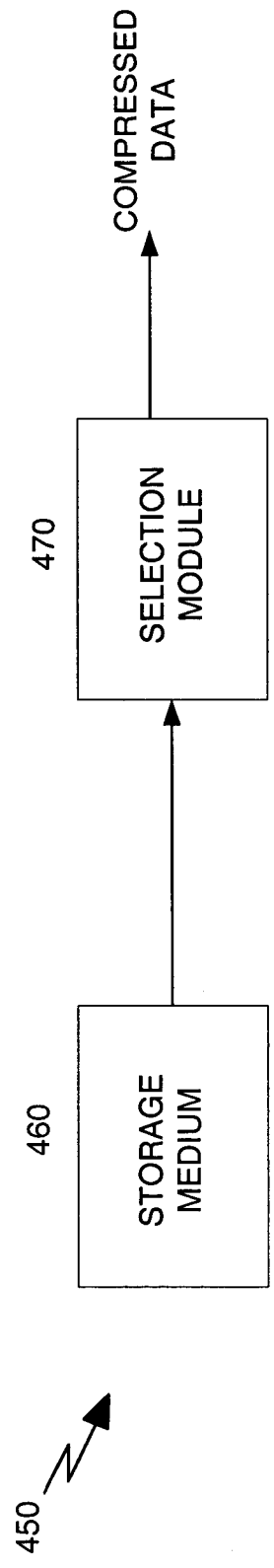

Distribution center 320 may comprise a server 450 shown in FIG. 4B that provides compressed data to presentation system 330. Server 450 may comprise a storage medium 460 and a selection module 470. Storage medium 460 stores an inventory of compressed data received from hub 310. The inventory may be the master inventory of may be a lower level inventory. Selection module 470 then extracts a selected number of layers from the inventory to generate a description of compressed data. For example, the selection may be based on the target application. The generated description of compressed data may then be used for playback at presentation system 330. It is to be noted that the generated descriptions of compressed data may be sub-sampled to provide a format for playback at presentation system 330.

Presentation system 330 comprises a decoder that decompresses the received image using a decompression algorithm that is inverse to the compression algorithm used at encoder 400. For example, if image compression is based on the ABSDCT, image is variable length decoded, inverse quantized and inverse DCT processed to enable display of the digital image.

The operations will be described more in detail below in FIGS. 5A and 5B. However, it should first be noted that a more typical hub 310 may comprise other elements such as a storage medium (not shown) to store one or more inventories generated by encoder 400. Hub 310 may also comprise a selection module to extract a selected number of layers to be output to distribution center 320. In addition, a processor (not shown) may be implemented to control one or more elements of encoder 400. Such processor may be implemented as part of encoder 400 or may be implemented outside of encoder 400. Similarly, a processor (not shown) may also be implemented to control one or more elements of distribution center 320. Such processor may be implemented as part of server 450 or may be implemented outside of server 450. Accordingly, a more typical distribution center 320 may comprise other elements as well.

More specifically, FIG. 5A shows an example method 500 for generating multiple descriptions of compressed data. In method 500, transform coefficients are generated (520) from input data and quantized (520). Here, the transform coefficients may be generated by transform module 410 using for example DCT or ABSDCT algorithm and may be quantized by quantization module 420 based on block size assignment. In order to extract lower resolution sequences from a compressed bit stream, the transform coefficients may be grouped and arranged in the order of significance. This order may be determined based on the resolution and bit rate requirements of target applications. The order may be optimized for image quality using traditional and ABS-specific, if applicable, rate-distortion techniques.

Figure 6:
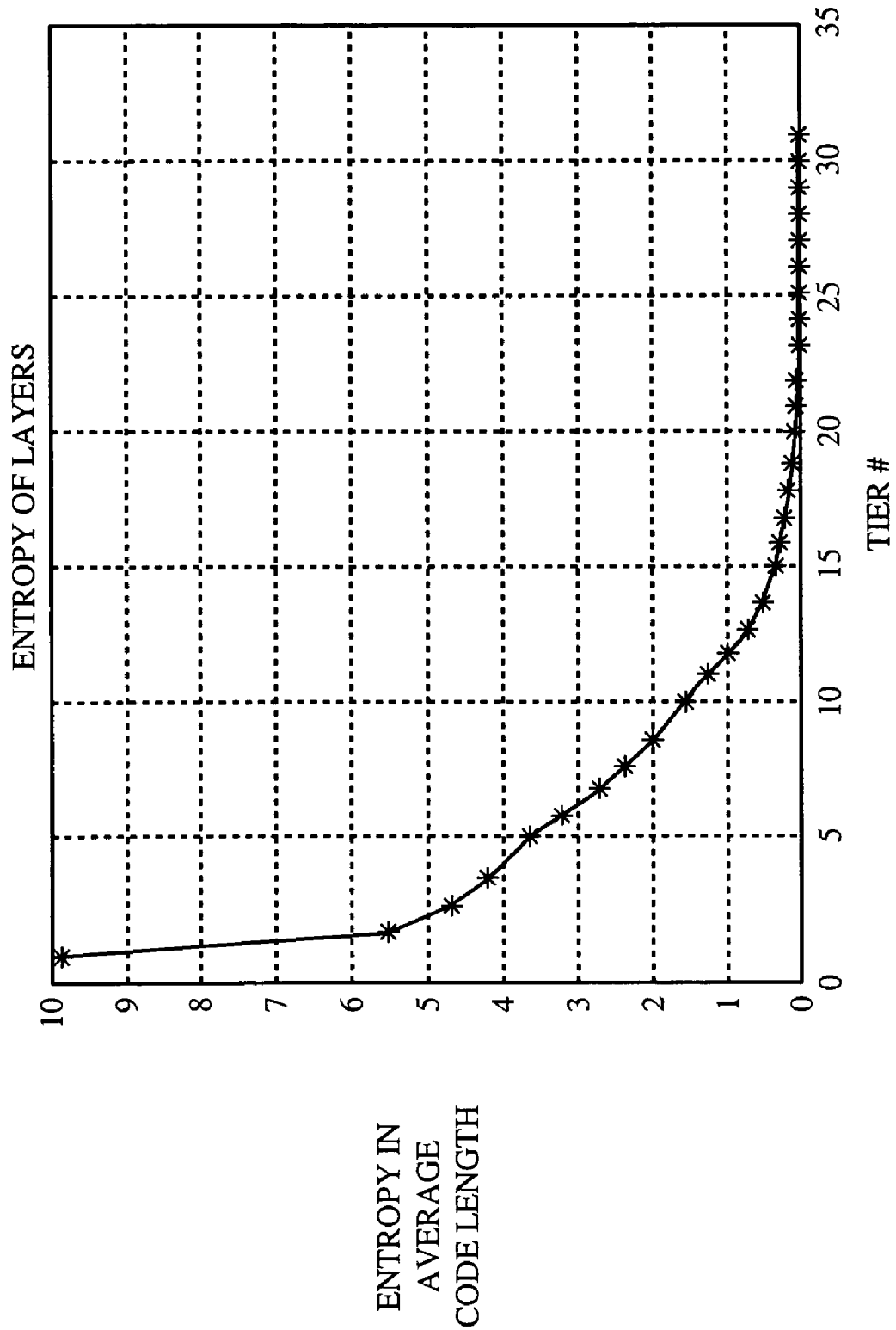
FIG. 6 shows an example energy distribution in tiers of AC coefficients in a 16×16 block.

Referring back to FIG. 5, an energy distribution of the quantized transform coefficients is generated (530). FIG. 6 shows an example of an energy distribution in tiers of AC coefficients in a 16×16 block when the transform coefficients are generated using, for example, ABSDCT based algorithm. The adaptive block size assignment algorithm is, by itself, an indicator of the rate-distortion characteristics of an image. Therefore, statistics may be compiled (histogram and entropy calculated) for the AC coefficients on each tier. FIGS. 7A-7D show examples of layers defined based on the statistics for a 2×2 sub-block, a 4×4 sub-block, a 8×8 sub-block and a 16×16 block. Based on the energy distribution, the transform coefficients are grouped (540) into layers.

In one embodiment, the AC coefficients may first be arranged in zig-zag order and their energy distribution across tiers may be used to group them into layers. The coefficients may further be split into multi-bit units and grouped into layers. The coefficients may be split into nibbles and grouped into layers. Here, higher and lower nibbles may be grouped separately into layers. This makes it more efficient to extract lower precision streams. The coefficients may also be split into nibbles and crumbs, and grouped into layers.

The energy distribution may be generated by layering module 430 or by a processor. The transform coefficients may also be grouped by layering module 430 or by a processor. A number of layers is entropy coded (550) to generate an inventory of compressed data. Here, entropy coder 440 may generate the description of compressed data. In addition, different number of layers may be entropy coded to generate different inventories. If each possible inventories is generated, a master inventory is generated. A specific inventory may then be generated by extracting lower precision stream.

For example, FIG. 5B shows a method 560 for generating a specific inventory of compressed data based on quantized transform coefficients of the data. In method 560, an inventory of compressed data that was generated based on an energy distribution of the quantized transform coefficients is accessed (570). A selected number of layers is then extracted (580) from the inventory to generate one description of compressed data. To generate a different description of data, a different number of layers is extracted, thereby providing multiple descriptions of compressed data. Here, an appropriate layer or layers are chosen to meet the bit rate requirements of the target application. A storage medium such as storage medium 460 may store the inventory and selection module 470 may extract the selected number of layers.

Figure 8:
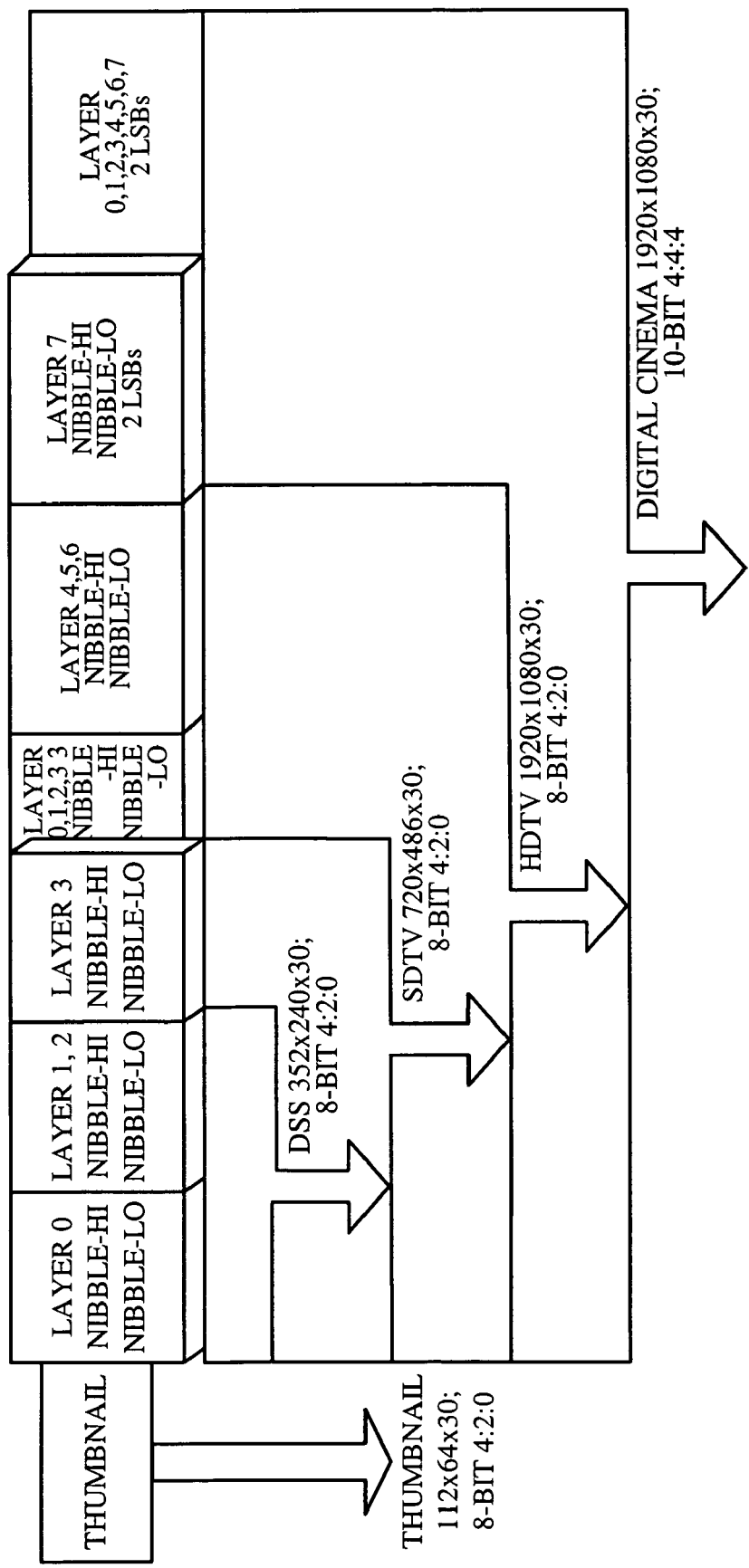
FIG. 8 shows an example layout of bit stream for a transform based compression system.

FIG. 8 shows an example of the bit stream layout that may be stored in a storage medium as an inventory. In the example, 10-bit transform coefficients are split into a higher nibble, lower nibble and 2 least significant bits (LSBs). DSS requires the higher and lower nibbles of layers 0 to 2 to generate 8-bit 4:2:0 352×240×30 image. SDTV requires the higher and lower nibbles of layers 0 to 3 to generate 8-bit 4:2:0 720× 486×30 image. HDTV requires the higher and lower nibbles of layers 0 to 6 to generate 8-bit 4:2:0 1920×1080×30 image. Digital Cinema requires the higher and lower nibbles of layers 0 to 7 as well as 2 LSBs or layers 0 to 7 to generate 10-bit 4:4:4 1920×1080×30 image. It is to be noted that other formats of lower and/or higher resolution may also be generated.

For example, FIG. 8 additionally includes a thumbnail inventory that may be generated by compressing the scaled ($1/256^{th}$) image formed by the means of the blocks (obtained from BSA). This image is compressed with ABSDCT. The target bit rate for this layer is 200 Kbps for a 112×64×24 fps image sequence. The thumbnail inventory is similar to preview option available with some formats like Encapsulated Postscript. Note that formats other than DSS, SDTV, HDTV, Digital Cinema and Thumbnail, may also be added to the master inventory by using different combinations of layers, nibbles and LSBs.

Accordingly, multiple inventories of layers of compressed data are generated to meet the requirements of target applications. Thereafter, necessary layers are extracted or cropped from the multiple layers to provide a specific description of compressed data for a target application. In an alternative embodiment, an archival compression may be performed to generate an archival inventory. To generate a specific inventory for a target application, the bit stream is decoded to an archival quality playback sequence. The DC playback sequence may then be extracted from the bit stream.

More particularly, the archival compression may be generated by transform based compression using a reference quantization step. Input image may be discrete cosine transformed, quantized using a reference quantization step and variable length encoded to generate the archival compressed bit stream. To extract a specific inventory, the compressed bit stream is variable length decoded and re-quantized. For example if the reference quantization step is A with corresponding value a and the target application requires a quantization step of B with corresponding value b, the quantization step for the re-quantization would be determined based on the required scaling of the reference quantization step. Here, it would be b/a. The bit stream may then be variable length coded and sent to a presentation system for playback.

It should be apparent to those skilled in the art that the elements of encoder 400 and/or a server 450 may be rearranged without affecting the operations. Also, embodiments may be implemented by hardware, software, firmware, middleware, microcode, or any combination thereof. When implemented in software, firmware, middleware or microcode, the program code or code segments to perform the necessary tasks may be stored in a machine readable medium such as storage medium 460 respectively, or in a separate storage(s) not shown. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Therefore, the foregoing embodiments are merely examples and are not to be construed as limiting the invention. The description is intended to be illustrative, and not to limit the scope of the claims. As such, the present teachings can be readily applied to other types of apparatuses and many alternatives, modifications, and variations will be apparent to those skilled in the art.

What is claimed is:

1. A method for generating multiple descriptions of compressed data, the method comprising:
   generating transform coefficients from input data;
   quantizing the transform coefficients;
   generating an energy distribution of the quantized transform coefficients;
   grouping the transform coefficients into layers based on the energy distribution;
   entropy coding a first number of the layers to generate a first description of compressed data; and
   entropy coding a second number of the layers to generate a second description of compressed data.

2. The method of claim 1, wherein grouping the transform coefficients comprises:
grouping the transform coefficients in an order of significance.

3. The method of claim 1, wherein grouping the transform coefficients comprises:
splitting the transform coefficients into multi-bit units; and
grouping the multi-bit units into layers.

4. The method of claim 1, wherein grouping the transform coefficients comprises:
splitting the transform coefficients into nibbles; and
grouping the nibbles into layers.

5. The method of claim 4, wherein grouping the nibbles comprises:
grouping higher and lower nibbles separately into layers.

6. The method of claim 4, wherein grouping the transform coefficients further comprises:
splitting the transform coefficients into crumbs; and
grouping the nibbles and crumbs into layers.

7. The method of claim 1, further comprising:
entropy coding each of the layers to generate a master inventory of compressed data.

8. The method of claim 7, wherein entropy coding the first and second numbers of layers comprises:
entropy coding first and second selected numbers of the layers by extracting the first and second selected numbers of the layers from the master inventory.

9. The method of claim 1, wherein generating the transform coefficients comprises:
generating transform coefficients using absolute discrete cosine transform (DCT).

10. The method of claim 1, further comprising:
arranging the quantized transform coefficients prior to generating the energy distribution.

11. Apparatus for generating multiple descriptions of compressed data comprising:
means for generating transform coefficients from input data;
means for quantizing the transform coefficients;
means for generating an energy distribution of the quantized transform coefficients;
means for grouping the transform coefficients into layers based on the energy distribution;
means for entropy coding a first number of layers to generate a first description of compressed data; and
means for entropy coding a second number of the layers to generate a second description of compressed data.

12. The apparatus of claim 11, wherein the means for grouping the transform coefficients comprises:
means for splitting the transform coefficients into multi-bit units; and
means for grouping the multi-bit units into layers.

13. The apparatus of claim 11, wherein the means for grouping the transform coefficients comprises:
means for splitting the transform coefficients into nibbles; and
means for grouping the nibbles into layers.

14. The apparatus of claim 13, wherein the means for grouping the nibbles comprises:
means for grouping higher and lower nibbles separately into layers.

15. The apparatus of claim 13, wherein the means for grouping the transform coefficients further comprises:
means for splitting the transform coefficients into crumbs; and
means for grouping the nibbles and crumbs into layers.

16. The apparatus of claim 11, further comprising:
means for entropy coding each of the layers to generate a master inventory of compressed data.

17. The apparatus of claim 16, wherein means for entropy coding the first and second numbers of layers comprise:
means for extracting the first and second numbers of layers from the master inventory.

18. The apparatus of claim 11, wherein generating the transform coefficients comprises:
means for generating transform coefficients using absolute discrete cosine transform (DCT).

19. The apparatus of claim 11, further comprising:
means for arranging the quantized transform coefficients prior to generating the energy distribution.

20. Apparatus for generating multiple descriptions of compressed data comprising:
a transform module configured to generate transform coefficients from input data;
a quantization module coupled to the transform module and configured to quantize the transform coefficients;
a layering module coupled to the quantization module, the layering module configured to generate an energy distribution of the quantized transform coefficients and to group the transform coefficients based on the energy distribution; and
an entropy coder coupled to the layering module and configured to entropy code a first number of the layers to generate a first description of compressed data and entropy code a second number of the layers to generate a second description of compressed data.

21. The apparatus of claim 20, wherein the entropy coder entropy codes each of the layers to generate a master inventory of compressed data and wherein the apparatus further comprises:
a storage medium configured to store the master inventory.

22. The apparatus of claim 21, further comprising:
a selection module configured to extract the first and second numbers of layers from the master inventory.

23. A method for generating compressed data based on quantized transform coefficients of the data, the method comprising:
accessing an inventory of multiple layers of compressed data generated based on an energy distribution of the quantized transform coefficients, wherein the multiple layers comprise different entropy coded layers of compressed data;
extracting a first selected number of layers from the inventory based on a first bit rate requirement to generate a first description of the compressed data; and
extracting a second selected number of layers from the inventory based on a second bit rate requirement to generate a second description of the compressed data.

24. The method of claim 23, wherein accessing the inventory of multiple layers comprises:
accessing a master inventory of each multiple layers of compressed data generated based on an energy distribution of the quantized transform coefficients.

25. Apparatus for generating compressed data based on quantized transform coefficients of the data, the apparatus comprising:
means for accessing an inventory of multiple layers of compressed data generated based on an energy distribution of the quantized transform coefficients, wherein the multiple layers comprise different entropy coded layers of compressed data;

means for extracting a first selected number of layers from the inventory based on a first bit rate requirement to generate a first description of the compressed data; and means for extracting a second selected number of layers from the inventory based on a second bit rate requirement to generate a second description of the compressed data.

26. The apparatus of claim 25, wherein the means for accessing the inventory of multiple layers comprises:

means for accessing a master inventory of each multiple layers of compressed data generated based on an energy distribution of the quantized transform coefficients.

27. Apparatus for generating compressed data based on quantized transform coefficients of the data, the apparatus comprising:

a storage medium configured to store an inventory of multiple layers of compressed data generated based on an energy distribution of the quantized transform coefficients, wherein the multiple layers comprise different entropy coded layers of compressed data; and a selection module coupled to the storage medium and configured to extract a first selected number of layers from the inventory based on a first bit rate requirement to generate a first description of the compressed data, and to extract a second selected number of layers from the inventory based on a second bit rate requirement to generate a second description of the compressed data.

28. The apparatus of claim 27, wherein the storage medium is configured to store a master inventory of each multiple layers of compressed data generated based on an energy distribution of the quantized transform coefficients.

29. A computer program product, comprising:
a computer readable medium including:
code for generating transform coefficients from input data;
code for quantizing the transform coefficients;
code for generating an energy distribution of the quantized transform coefficients;
code for grouping the transform coefficients into layers based on the energy distribution;
code for entropy coding a first number of layers to generate a first description of compressed data; and
code for entropy coding a second number of the layers to generate a second description of compressed data.

30. The computer readable medium of claim 29, wherein the code for grouping the transform coefficients comprises:
code for grouping the transform coefficients in an order of significance.

31. The computer readable medium of claim 29, wherein the code for grouping the transform coefficients comprises:
code for splitting the transform coefficients into multi-bit units; and
code for grouping the multi-bit units into layers.

32. The computer readable medium of claim 29, wherein the code for grouping the transform coefficients comprises:
code for splitting the transform coefficients into nibbles; and
code for grouping the nibbles into layers.

33. The computer readable medium of claim 32, wherein the code for grouping the nibbles comprises:
code for grouping higher and lower nibbles separately into layers.

34. The computer readable medium of claim 32, wherein the code for grouping the transform coefficients further comprises:
code for splitting the transform coefficients into crumbs; and
code for grouping the nibbles and crumbs into layers.

35. The computer readable medium of claim 29, further comprising:
code for entropy coding each of the layers to generate a master inventory of compressed data.

36. The computer readable medium of claim 35, further comprising:
code for extracting the first and second numbers of layers from the master inventory.

37. The computer readable medium of claim 29, wherein the code for generating the transform coefficients comprises:
code for generating transform coefficients using absolute discrete cosine transform (DCT).

38. The computer readable medium of claim 29, further comprising:
code for arranging the quantized transform coefficients prior to generating the energy distribution.

* * * * *